(12) United States Patent
Tran et al.

(10) Patent No.: US 7,506,070 B2
(45) Date of Patent: Mar. 17, 2009

(54) METHOD AND SYSTEM FOR STORING AND RETRIEVING EXTENSIBLE MULTI-DIMENSIONAL DISPLAY PROPERTY CONFIGURATIONS

(75) Inventors: Luu D. Tran, Santa Clara, CA (US); Jeffrey T. Blattman, San Jose, CA (US); Thomas R. Mueller, Fremont, NE (US); Su-Chong Myong, Brisbane, CA (US)

(73) Assignee: Sun Microsytems, Inc., Santa Clara, CA (US)

( * ) Notice: Subject to any disclaimer, the term of this patent is extended or adjusted under 35 U.S.C. 154(b) by 1383 days.

(21) Appl. No.: 10/621,486

(22) Filed: Jul. 16, 2003

(65) Prior Publication Data

US 2005/0015513 A1 Jan. 20, 2005

(51) Int. Cl.
*G06F 15/16* (2006.01)
(52) U.S. Cl. ................. 709/246; 709/217; 709/219; 455/414.1; 455/414.4
(58) Field of Classification Search ............. 709/246, 709/217, 219; 455/414.1, 414.4
See application file for complete search history.

(56) References Cited

U.S. PATENT DOCUMENTS

| | | | | |
|---|---|---|---|---|
| 6,430,624 | B1 * | 8/2002 | Jamtgaard et al. | 709/246 |
| 6,611,876 | B1 * | 8/2003 | Barrett et al. | 709/246 |
| 6,636,855 | B2 * | 10/2003 | Holloway et al. | 707/10 |
| 6,741,853 | B1 * | 5/2004 | Jiang et al. | 455/418 |
| 2002/0022453 | A1 * | 2/2002 | Balog et al. | 455/41 |
| 2002/0052895 | A1 * | 5/2002 | Keating | 707/514 |
| 2002/0091700 | A1 * | 7/2002 | Steele et al. | 707/100 |
| 2002/0120779 | A1 * | 8/2002 | Teeple et al. | 709/246 |
| 2002/0184534 | A1 | 12/2002 | Rangan et al. | |
| 2003/0033356 | A1 | 2/2003 | Tran et al. | |
| 2003/0033357 | A1 | 2/2003 | Tran et al. | |
| 2003/0033358 | A1 | 2/2003 | Tran et al. | |
| 2003/0033377 | A1 | 2/2003 | Chatterjee et al. | |
| 2003/0033434 | A1 | 2/2003 | Kavacheri et al. | |
| 2003/0033524 | A1 | 2/2003 | Tran et al. | |
| 2003/0069940 | A1 | 4/2003 | Kavacheri et al. | |
| 2003/0084165 | A1 * | 5/2003 | Kjellberg et al. | 709/227 |

(Continued)

FOREIGN PATENT DOCUMENTS

GB 2 349 244 A 10/2000

(Continued)

*Primary Examiner*—Kenny S Lin
*Assistant Examiner*—Duyen Doan
(74) *Attorney, Agent, or Firm*—Osha • Liang LLP

(57) ABSTRACT

A method and system for storing and retrieving extensible multi-dimensional display property configurations. In one embodiment, a method is disclosed for the display of content that is configurable to a variety of contextual environments by reading a plurality of settings that are associated with an electronic device requesting content. The plurality of settings defines the contextual environment of the electronic device. The method continues by incorporating the plurality of settings as values in the list of filter criteria. The list of filter criteria is organized in a hierarchical order and specifies the format within which to present the content to be displayed at the electronic device. Thereafter, the method continues by matching the list of filter criteria with a resource to be displayed with the content. The resource is retrieved from memory for ultimate delivery to the electronic device for display.

12 Claims, 8 Drawing Sheets

U.S. PATENT DOCUMENTS

2004/0039814 A1 * 2/2004 Crabtree et al. .............. 709/224

FOREIGN PATENT DOCUMENTS

| | | | |
|---|---|---|---|
| GB | 2 368 147 A | 4/2002 |
| GB | 2 377 296 A | 1/2003 |
| WO | WO01/11452 A2 | 2/2001 |
| WO | WO02/069543 A2 | 9/2002 |

* cited by examiner

300

|  | English | French |
|---|---|---|
| Device Type A | Resource 1 | Not Available |
| Browser A | Resource 2 | Resource 3 |

Fig. 3

METHOD AND SYSTEM FOR STORING AND RETRIEVING EXTENSIBLE MULTI-DIMENSIONAL DISPLAY PROPERTY CONFIGURATIONS

RELATED UNITED STATES PATENT APPLICATIONS

This Application is related to U.S. patent application Ser. No. 10/622,032 by John Saare and Thomas Mueller, filed on the same date as this present Application, entitled "A Method and System for Device Specific Application Optimization via a Portal Server", and assigned to the assignee of the present invention.

This Application is related to U.S. patent application Ser. No. 10/621,853 by John Saare and Thomas Mueller., filed on the same date as this present application, entitled "System and Method for Single-Sign-On Access to a Resource via A Portal Server", and assigned to the assignee of the present invention.

This Application is related to U.S. patent application Ser. No. 10/622,151 by Sathayanarayanan N. Kavacheri and Luu Tran., filed on the same date as this present Application, entitled "Hierarchical Configuration Attribute Storage and Retrieval", and assigned to the assignee of the present invention.

BACKGROUND OF THE INVENTION

1. Field of the Invention

Embodiments of the present invention relate to the field of web portals. More particularly, embodiments of the present invention relate generally to the storing and retrieving of multi-dimensional display configurations that are extensible.

2. Related Art

Delivering content over a network, such as, the Internet, takes into account various contextual parameters. For instance the retrieval and the storage of resources by an electronic device associated with an end user is based on a set of criteria that sets up the context from which the end user is operating.

A typical set of criteria may include language, geographic region, web browser, and device. The language criterion sets up the language the content is presented to the end user. The geographic region establishes from what region the end user is associated, and can be used to further qualify the language criterion. For instance, two slightly different versions of the French language are spoken in France and Canada, namely, native French and Canadian French. The device criterion establishes from which device the end user is using to view the displayed content.

Previously, developers of web content were only concerned with one primary contextual environment. Nearly everyone accessing web content over the Internet was using a desktop computer enabled with one of two major web browsers. As such, web content could easily be developed to support this primary contextual environment. That is, developers needed only to develop web content for delivery using hypertext markup language (HTML) that was suitable for viewing by a desktop computer in a particular geographic region. Specifically, the name value pairs in the HTML language need not be changed to support various contextual environments, since there was only one environment of concern.

However, with the advent of mobile access and wireless communication, many variations of contextual environments were suddenly created. As a result, web content that was suitable for delivery to a desktop computer was not suitable for delivery to a wireless electronic device. For instance, web content designed for presentation on a desktop display could not easily be delivered and presented on a much smaller display for a mobile device, such as, a mobile phone, or a personal digital assistant (PDA).

Moreover, translation of HTML formatted to deliver content to a desktop computer environment to a suitable wireless protocol for delivery of web content to wireless devices is difficult. The two contextual environments are sufficiently different to prevent an easy translation. For instance, text designed for display on a large desktop display can include hundreds of characters per line. On the other hand, a small display associated with a wireless device may only be able to support text of a few characters in length. A straight translation from HTML to a wireless protocol would require the end user to endlessly scroll through the text a few characters at a time.

Also, many wireless devices exist. Each of these wireless devices may present a unique format for display. That is, there may be corresponding and unique display formats for each of the wireless devices. As can be imagined, a logistical nightmare would exist for a content provider to develop content that is fully supportable by each of the varying formats. That would prove to be prohibitively expensive, as each format would require its own team of web designers to display the content appropriately.

In addition, a typical set of criteria was not extensive, since the contextual environment previously did not vary. The typical contextual environment of the prior art described an end user operating from his or her home with a desktop computer within a specific geographic location. As such, the typical set of criteria did not include other contextual environments, such as, mobile access, access from the office, access from the home, access from a wireless device, access from other geographic locations, access using other languages, etc.

As a result, stringent development of web content for a specific contextual environment, namely a desktop computer using a major browser in a particular geographic region, is not capable of delivering web content to a variety of contextual environments, including a variety of wireless mobile access environments. Specifically, previous development of web content for a particular contextual environment did not allow for extending the contextual environment within the markup language used to deliver the content to include other contextual environments.

SUMMARY OF THE INVENTION

Accordingly, various embodiments of the present invention disclose a method and system for the storage and retrieval of extensible, multi-dimensional display property configurations that are used to deliver content to a variety of contextual environments. As a result, delivery of web content is easily configurable to support numerous contextual environments, including a wireless mobile access environment. Moreover, the extensible framework provided for storing and retrieving display property configurations enables content to be presented in multiple dimensions thereby supporting numerous contextual environments, including those within the mobile access environment.

Specifically, embodiments of the present invention describe a method and system for the display of content that takes into account the varying contextual environments of end users that request the content. In one embodiment, a computer implemented method is disclosed for the display of content that is configurable to a variety of contextual environments. The method begins by reading a plurality of settings that are associated with an electronic device. The electronic device is requesting the content. The plurality of settings defines a context within which to display content at the electronic device to an end user associated with the electronic device.

The embodiment of the method continues by incorporating the plurality of settings into values associated with a list of filter criteria. The list of filter criteria is organized in a hierarchical order and specifies the format within which to present the content to be displayed at the electronic device. This hierarchical order sets an order of preference between each of the filter criterion and is used to configure the content to the electronic device.

Thereafter, the embodiment of the method continues by matching the list of filter criteria with a resource to be displayed with the content. The resource was previously developed and stored in memory to meet the requirements of the list of filter criteria. The embodiment then retrieves the resource from memory for ultimate delivery to the electronic device for display.

In another embodiment, a method of displaying content to a wireless electronic device through a portal server is disclosed. The portal server is capable of configuring content to a variety of contextual environments. The method begins by storing the content in a data store that is accessible by a portal server. The content comprises a plurality of resources. Each of the plurality of resources is configured to a different contextual environment, and is selectable by chains of filter criteria. As such, the content is separately configurable to each of the plurality of wireless electronic devices.

The method continues by storing a plurality of chains of filter criteria. The plurality of chains of filter criteria defines a plurality of resources that comprises the content. Which filter criteria are selected in a particular chain of filter criteria will determine the resource to be displayed as the content at the electronic device. Within each of the chains of filter criteria, the filter criteria are organized in a hierarchical order. In this way, certain contextual parameters are given priority over other contextual parameters.

The method continues by configuring the content to the wireless electronic device by matching a list of filter criteria to one of a plurality of chains of filter criteria. The list of filter criteria is adjusted for settings that are associated with the wireless electronic device that is requesting the content. The resulting plurality of chain of filter criteria along with the matched filter criteria define a resource to be displayed with the content at the electronic device.

In still another embodiment, a portal server is disclosed that is capable of storing and retrieving content that is configurable to a variety of contextual environments. Specifically, the portal server comprises a data store, a memory, and a matching engine. The data store stores a plurality of resource data that is associated with the content provided through a channel via a portal server. Each of the plurality of resource data is configured to support a different contextual environment. As such, depending on which resource data is selected, the content is configurable to a variety of contextual environments.

The memory is communicatively coupled to the data store. The memory stores a plurality of settings that is associated with an electronic device. The electronic device is requesting the content through a network, such as, the Internet. The plurality of settings defines a contextual environment within which to display the content at the electronic device.

A list creator is communicatively coupled to the memory. The list creator creates a list of filter criteria that is used to select the proper configuration of content to be displayed at the electronic device. The list creator incorporates the plurality of settings as values associated with the list of filter criteria.

A matching engine is communicatively coupled to the memory for matching the list of filter criteria with a resource to be displayed with said content. More specifically, the resource is associated with a chain of filter criteria that is matched to the list of filter criteria, previously created.

BRIEF DESCRIPTION OF THE DRAWINGS

FIG. 3 is a chart illustrating the plurality of resources available for a channel providing content, in accordance with one embodiment of the present invention.

DETAILED DESCRIPTION OF THE INVENTION

Figure 1:
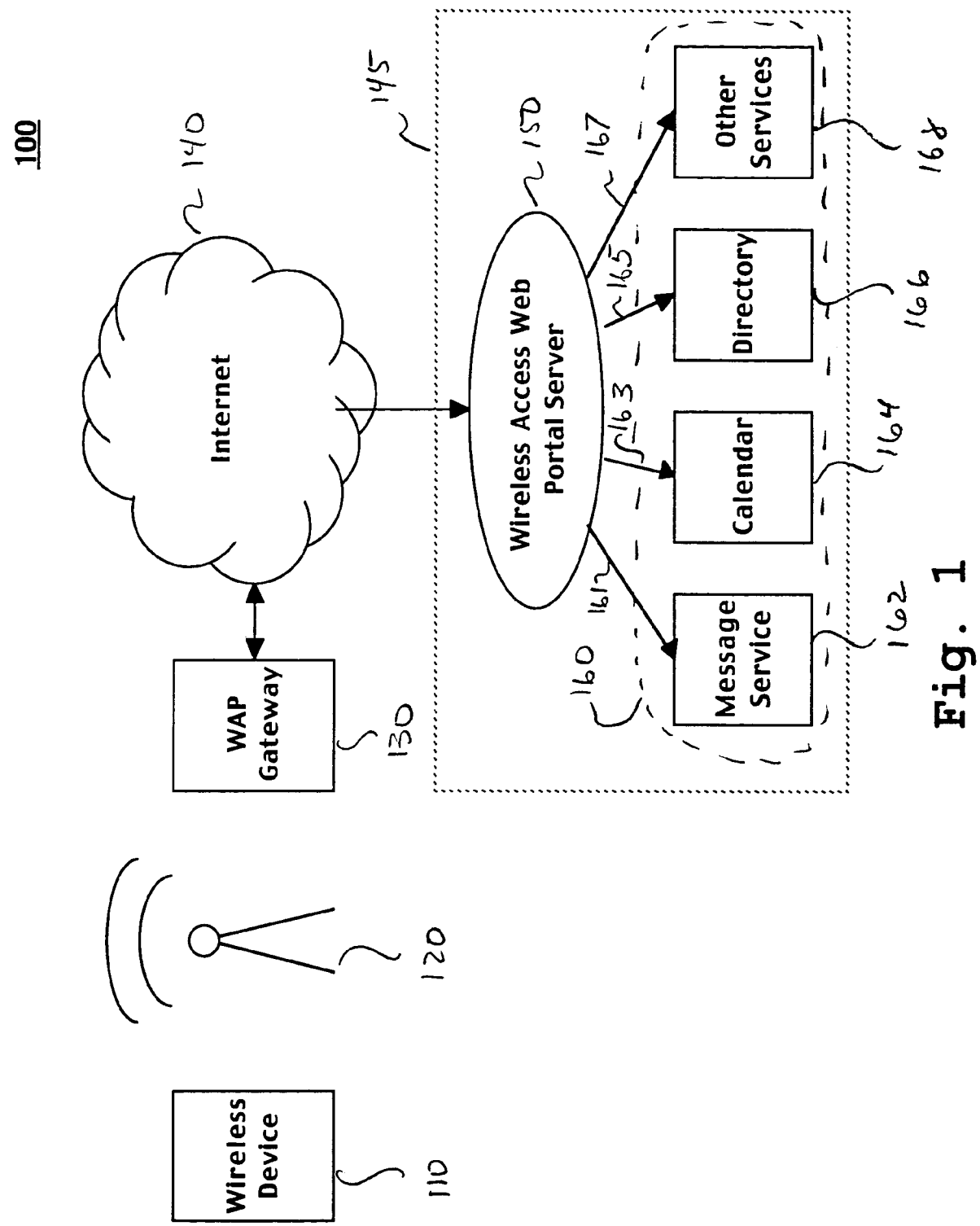
FIG. 1 is a block diagram of a communication network that includes a web portal server that is capable of configuring channel data for display to a wireless device, in accordance with one embodiment of the present invention.

Reference will now be made in detail to the preferred embodiments of the present invention, a method and system for the storage and retrieval of configurable resources that are used to deliver content to a variety of contextual environments, examples of which are illustrated in the accompanying drawings.

Embodiments of the present invention can be implemented on software running on a computer system. The computer system can be an embedded system, a personal computer, notebook computer, server computer, mainframe, networked computer, handheld computer, personal digital assistant, workstation, and the like. This software program is operable for storing and retrieving extensible, multi-dimensional display property configurations that are used to deliver content to a variety of contextual environments. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reading," "incorporating," "matching," "retrieving," "sending," and "returning," "falling back," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, various embodiments of the present invention disclose a method and system for the storage and retrieval of extensible, multi-dimensional display property configurations that are used to deliver content to a variety of contextual environments. As a result, delivery of web content is easily configurable to support numerous contextual environments, including a wireless mobile access environment. Moreover, the extensible framework provided for storing and retrieving display property configurations enables content to be presented in multiple dimensions thereby supporting numerous contextual environments, including those within the mobile access environment. Thus content located on a server is configurable to a variety of contextual environments, including the wireless mobile environments associated with the numerous wireless electronic devices.

While various embodiments of the present invention are described within wireless network environments, other embodiments of the present invention are well suited to applications within wired environments. As such, various embodiments of the present invention are well suited for the storage and retrieval of extensible, multi-dimensional display property configurations that are used to deliver content to a variety of contextual environments involving wired electronic devices.

Referring now to FIG. 1, a block diagram of an exemplary communication network 100 is disclosed that is capable of storing and retrieving specific property values that provide content to a specific contextual environment, in accordance with one embodiment of the present invention. In that way, content provided by a server is configurable to a variety of contextual environments.

Although the present embodiment discloses the communication network 100 as depicted in FIG. 1 operating in a wireless application protocol (WAP) environment, other embodiments of the present invention are well suited to similarly configured communication networks 100 operating in other environments using other standard protocols, including other wireless network environments.

The communication network 100 is comprised of a wireless device 110, a transmission infrastructure 120, a WAP gateway 130, the Internet 140 a web portal server 150, and a plurality of services 160 provided by channels in the web portal server. The wireless device 110 comprises any mobile device that is capable of interacting with the web portal server 150 in order to receive content. The transmission infrastructure 120 comprises transmitters, receivers, etc. for transferring data to and from the wireless device form the web portal server 150.

In a WAP environment, the WAP gateway 130 converts the wireless markup language (WML)/hypertext transport protocol (HTTP) content and protocol into a binary compressed, encoded, and encrypted version of the WML over the WAP network 100. In addition, the WAP gateway 130 also performs the translation of WAP commands into HTTP requests which are sent over the Internet 140.

The Internet 140, in general, comprises a set of computer networks that are communicatively coupled together to enable the transfer of data between nodes within the Internet 140. Communication is enabled through a common suite of protocols, such as, the transmission control protocol/internet protocol (TCP/IP). Although the present embodiment is disclosed using the Internet 140, other embodiments are well suited to communication with a web portal for the transfer of data through any network, such as a LAN, or a wide area network (WAN), etc.

Communicatively coupled to the Internet 140 is a web portal 145. The web portal 145 comprises a wireless access web portal server 150. The wireless access web portal server 150 is capable of extending core services provided by the web portal server 145 to mobile devices. Moreover, the wireless access web portal server 150 is capable of providing content that is configurable to a variety of contextual environments. For instance, the wireless access web portal server 150 is capable of providing a plurality of services 160 through the communication network 100 to the wireless device 110. As an example, the plurality of services 160 comprises a message service 162, a calendar 164, a directory service 166, and other services 168.

In one embodiment, the wireless access web portal server 150 is capable of aggregating content provided for by channels, possibly pre-selected by the end user, and serving the content in a format compatible with the contextual environment within which the wireless device 110 is operating. The content provided for by the channels is stored in the web portal 145.

As shown in FIG. 1, channel 161 provides message content associated with message service 162. The channel 163 provides calendar data from the calendar service 164. The channel 165 provides directory data from the directory service 166, and the channel 167 provides a host of other services. The channels comprise content that is pre-designed but configurable to a variety of contextual environments, including a wireless environment. The channels, in one embodiment, provide a summary of data information from a back-end content provider. Direct communication with the back-end content provider is provided through a link.

Figure 2:
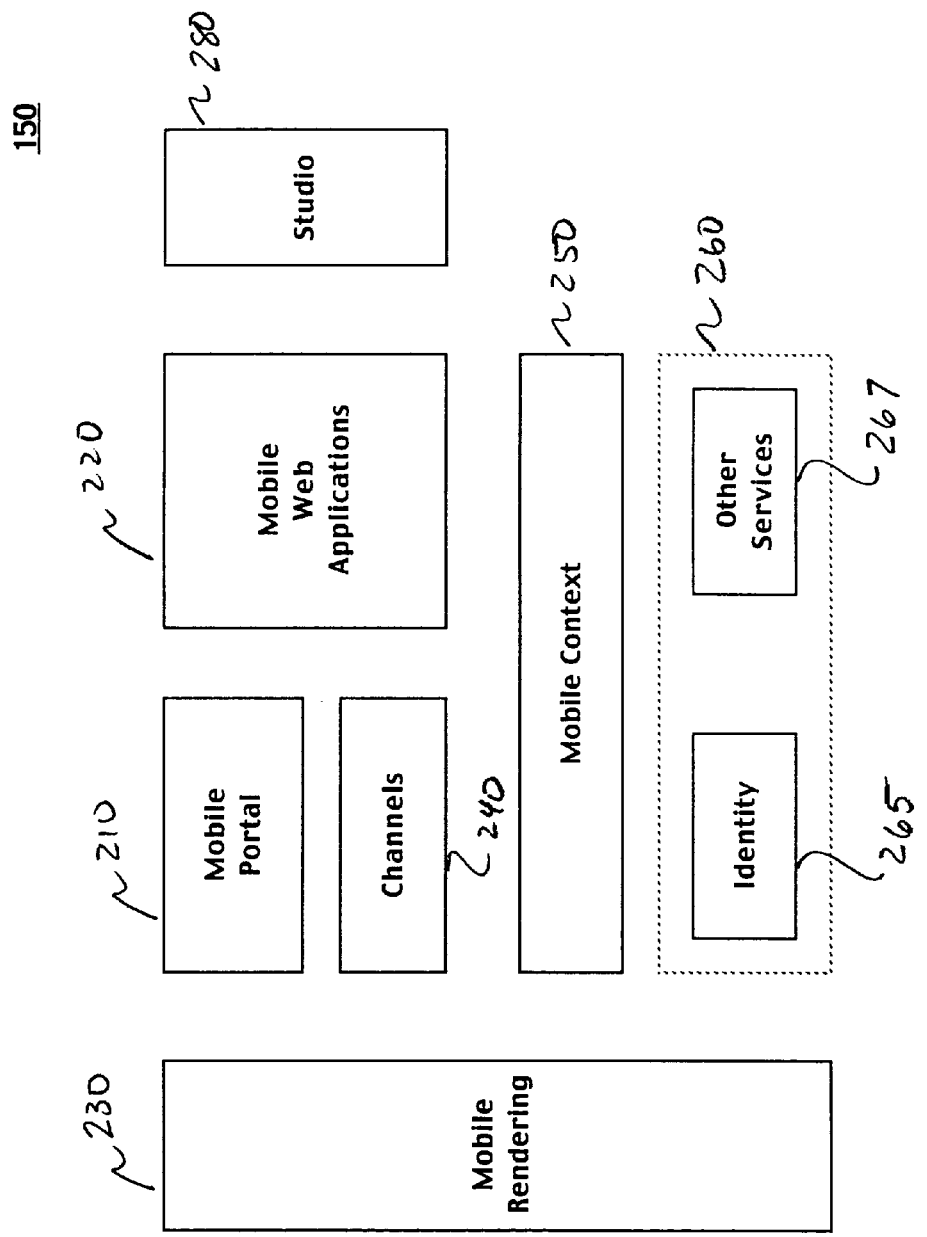
FIG. 2 is a block diagram of a web portal server of FIG. 1 that extends services provided by a portal server to wireless devices, in accordance with one embodiment of the present invention.

Referring now to FIG. 2, a block diagram of the wireless access web portal server 150 of FIG. 1 that is capable of storing and retrieving property values defining content that is configurable to a variety of contextual environments is shown, in accordance with one embodiment of the present invention. It is appreciated that the framework of the wireless access web portal server 150 as shown in FIG. 2 is exemplary and that embodiments of the present invention may be implemented in frameworks of various configurations. Additionally, it is appreciated that some components of wireless access web portal server 150 are omitted for clarity.

In the present embodiment, the wireless access web portal server 150 comprises a mobile portal module 210. Mobile portal module 210 displays the homepage for wireless devices (e.g., wireless device 110) accessing the wireless access web portal server 150 through a network (e.g., communication network 100). The home page is typically where end users associated with the wireless devices first interact with the wireless access web portal 150.

In the home page, channels of content, representing different data services, are displayed and are selected based upon end-user preferences, in one embodiment. As such, mobile portal 210 provides a "micro-desktop" environment for various wireless devices that are connecting with the wireless access web portal server 150 via a communication network 100, as well as, providing a standard desktop environment for desktop computer systems that are accessing the web portal 145 via the communication network 100.

The wireless access web portal server 150 further comprises a mobile web applications module 220 in the embodiment of FIG. 2. The mobile web applications module 220 provides a standard user interface to application logic that is formatted for desktop computers, as well as a separate "micro-user interface" for mobile devices to application logic that is formatted for mobile devices. Mobile web applications module 220 may provide other user interfaces for other operating environments as well. For example, a "voice-user interface" could be provided to facilitate voice control of application logic.

The wireless access web portal server 150 further comprises a mobile rendering module 230, in the embodiment of FIG. 2. As such, mobile rendering module 230 is responsible for determining the device type of the wireless device accessing wireless access web portal server 150 and for presenting content in a usable fashion to that device. For example, mobile rendering module 230 may determine the manufacturer, and model number of the wireless device (e.g., mobile device 110 of FIG. 1) accessing the wireless access web portal server 150. Using this information, the wireless access web portal server 150 can access a database (not shown) to retrieve specific information about mobile device 110, such as, display size, whether it supports color, buffer size, markup language supported, browser supported, type of input device used, etc.

In one embodiment of the present invention, the mobile rendering module 230 is also capable of retrieving and storing property values that are associated with a plurality of resources. Selection of the resources enables the delivery of content from a channel on the wireless access web portal server that is configurable to a variety of contextual environments.

In addition, mobile rendering module 220 also handles pagination of content delivered to mobile devices, in one embodiment. Because of limitations in the buffer size or screen size of various mobile devices, content that typically is sent to a desktop computer in one response may have to be sent to a mobile device as a series of discreet messages. Mobile rendering module 320 also translates HTML data into a markup language supported by the wireless device accessing the wireless access web portal server 150.

The wireless access web portal server 150 further comprises a channels module 240, in the embodiment of FIG. 2. Channels module 240 collects data for various services or channels that are displayed on the homepage associated with an end-user. In one embodiment, summary information about available channels is displayed on the homepage. For example, in an e-mail channel, the summary information may comprise the headers for the first 5 e-mails in the inbox. This simply informs the end-user that there is mail in the inbox. The end-user, in one embodiment, views or manipulates the e-mail by directly linking to the e-mail application in the e-mail channel.

In addition, mobile context module 250 provides information that is shared by the applications and channels offered by wireless access web portal server 150 and sets up the environment in which they operate in a mobile context. For example, mobile enabling of e-mail has components in common with mobile enabling of a calendar program. Some of these components include device profiles such as screen size, buffer size, input mechanism, the number of bits-per-pixel (which indicates whether the display is color or black and white), and what languages are supported by the mobile device.

Mobile context module 250 also provides service profiles that are specific to the mobile context. For example, a user may utilize a different web browser or e-mail program on their mobile device than the one they use with their desktop computer. Information in the service profile may include the mail server name, port number, login and password, etc.

The wireless access web portal server 150 also comprises additional modules 260 that provide services not unique to a wireless environment. For example, the additional modules 260 of FIG. 2 comprise an identity module 265 and other services module 267.

The identity module 265 stores persistent data such as an end-user's credentials, log-in password, access privileges to various services, policy information, etc. Identity module 265 also provides a single sign-on capability so that an end-user need not have to log into various servers separately in one communication session, when, for example accessing e-mail or other web portal channels.

The other services module 267 represents the services generally with which any device can utilize and communicate with (e.g., e-mail, calendar, address book, messaging, etc).

In addition, the wireless access web portal server 150 also comprises a studio module 280. The studio module 280 provides a developer environment in which developers can create custom applications, channels, and interfaces as well as emulators for viewing on simulated desktops and/or mobile devices.

Turning now to FIG. 3, a chart 300 illustrating the plurality of resources available for a channel providing content is disclosed, in accordance with one embodiment of the present invention. The chart 300 illustrates the importance of a contextual environment for displaying content. In chart 300, the four possible resource options are available within a channel of content. Depending on the contextual environment, the most proper resource is selected for display on the electronic device that is requesting the content.

The contextual environment defines certain filter criteria that is used for determining the proper format to display content to an electronic device. The contextual environment may include descriptions of the device, the geographic location, the language used for presenting the content, time of day, greater than a parameter, less than a parameter, etc.

In chart 300, the four resource options provided by a channel of content comprise resource 1, resource 2, resource 3, and a fourth resource that is not available. Resource 1 is most applicable to a contextual environment that uses a device type A (e.g., Nokia, Ericcson, Motorola, etc.), and presents the content in English. For resource 1, the most important filter criteria are device type and language. This may be important if the end-user can only read the English language. Continuing on, resource 2 is most applicable to a contextual environment that uses browser A, and presents the content in English. Similarly, resource 3 is most applicable to a contextual environment that uses browser A, and presents the content in French.

The contextual environment is important in determining the proper resource to select that is configured to the contextual environment of the wireless device requesting the content. Selecting the proper resource to support a contextual environment is simple when the contextual environment is fully supported by the available resources. Selecting the proper resource for a particular environment is more difficult when all of the filter criteria are not fully supported.

However, embodiments of the present invention are well suited to selecting the most proper resource for a particular contextual environment, even when all of the filter criteria are not fully supported. For example, when the contextual environment of an electronic device requesting content comprises filter criterion of device type A, and is presented in the language of French, no applicable resource option is available. As such, embodiments of the present invention are capable of selecting the most proper resource by providing a hierarchical order to filter criteria, as will be more fully described below in FIGS. 5, 6 and 7.

For instance, embodiments for the present invention select between resource 1 and resource 3 as the filter criterion defining the contextual environment. Resource 2 is inapplicable since neither browser A nor the English language is presented within the contextual environment of the electronic device requesting the content.

As a result, embodiments of the present invention, by giving preference to one or the other of the filter criterion in a hierarchical order will select either resource 1, or resource 2, or neither one of the resources. If the device type A was given preference over the language French in placing the filter criterion of the contextual environment in a hierarchical order, then the proper selection is resource 1. This presupposes that the language filter criterion is optional, and not fully required. On the other hand, if the language French was given preference over the device type A, then the proper selection is resource 3, presupposing that the device type filter criterion is optional, and not fully required. Finally, if both the filter criteria defining the contextual environment are required, then no resource is selected, since there are no available resource options to satisfy both filter criteria.

Figure 4:
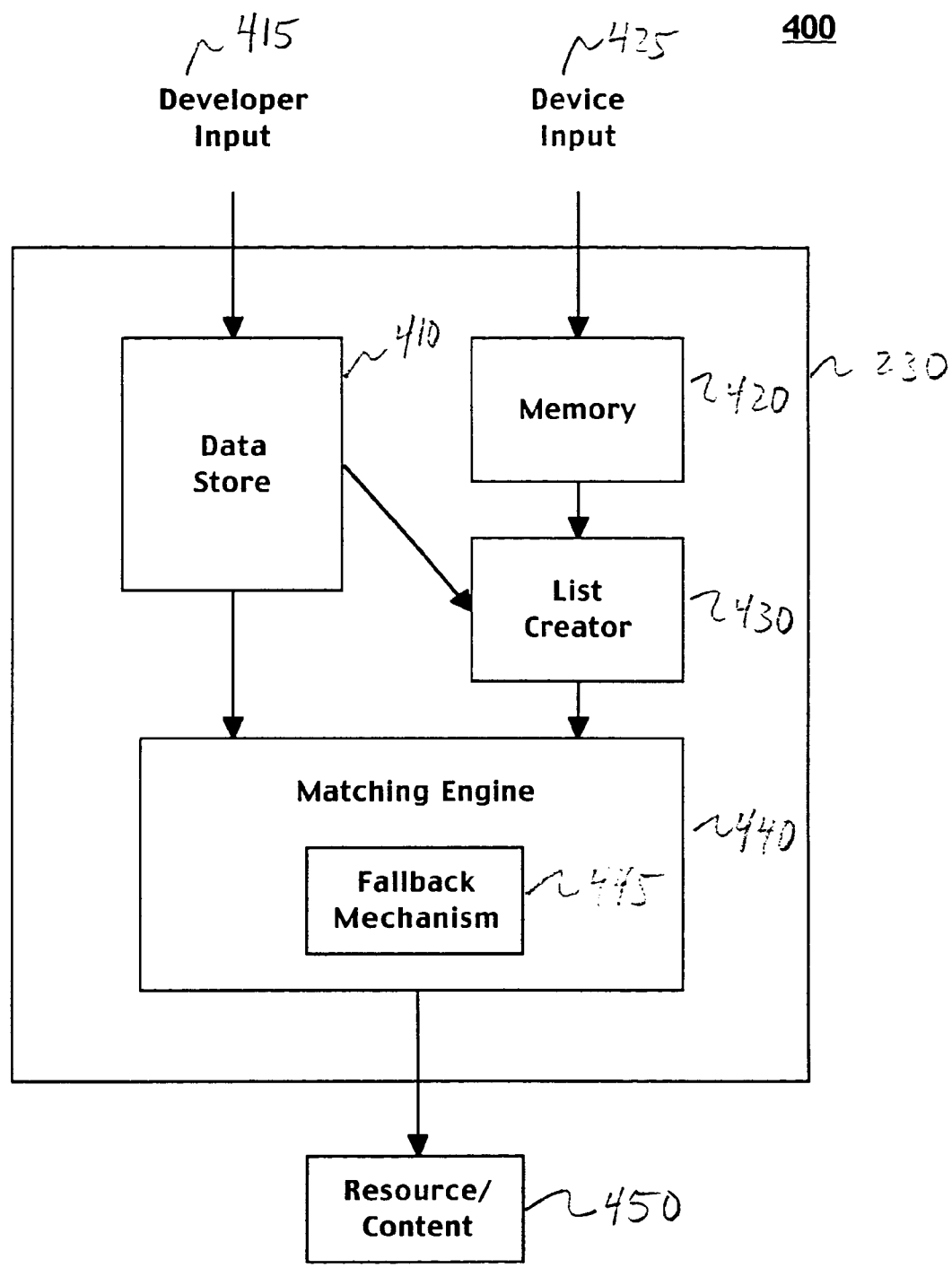
FIG. 4 is a data flow diagram illustrating the selection of resources as configurable content, in accordance with one embodiment of the present invention.

FIG. 4 is a data flow diagram 300 illustrating the selection of resources as configurable content within the mobile rendering module 230 of the wireless access mobile access server 150 of FIGS. 1 and 2, in accordance with one embodiment of the present invention. The present embodiment describes the process in which content is configured to a specific wireless electronic device that requests the content via the wireless access web portal server 150.

In the present embodiment, the wireless access web portal server 150 comprises a data store 410, a memory 420, a list creator 430, and a matching engine 440. In response to a request from an electronic device for data from a channel, a resulting resource 450 is selected that is configured for the contextual environment associated with the requesting electronic device.

The data store comprises a memory accessible by the wireless access web portal server. The data store is for storing a plurality of resources associated with content provided by a channel. The plurality of resources comprises various configurations for presenting the same content associated with a channel that provides services through the wireless access web portal server. The various configurations are associated with the various contextual environments from which an electronic device is displaying the content. As described previously, the contextual environment defines certain filter criteria that is used for determining the proper format to display content to an electronic device.

The data store presents the various configurations in a plurality of chains of filter criteria. Within each chain of filter criteria, numerous resources are presented depending on which of the filter criteria are satisfied. These resources represent the various configurations of the content that are configured for various contextual environments.

The data store also stores a list of filter criteria that is associated with the content. The list of filter criteria is organized in a hierarchical order that gives precedence between filter criteria applicable to the content. In one embodiment, the list of filter criteria in their hierarchical order is created by the developer of the various resources that represent the various configurations of the content. In this case, the developer orders the filter criteria in such a way as he or she best portrays the content in the various configurations of content.

The mobile rendering unit 230 also comprises a memory 420 for storing a plurality of settings associated with the wireless device that is requesting the content from the wireless access web browser. In one embodiment, the settings are included within the request for content from the electronic device. In another embodiment, the settings are previously stored in the memory, and provide for easy access to the settings.

The settings define the contextual environment within which the electronic device operates, and the environment to display the content. For example, the settings comprise mechanical parameters including device type, geographic location, screen size, etc. In addition, the settings comprise other intangible parameters, including time of day, language preferred, date later than qualifications, greater than or less than or equal to qualifications, etc. Additional settings are applicable in other embodiments of the present invention depending on the contextual environment described.

The mobile rendering unit 230 also comprises a list creator module 430. The list creator module incorporates the settings located in memory 420 into the list of filter criteria that is hierarchically ordered, as will be fully described below. This list of filter criteria incorporating the settings further defines the contextual environment of the electronic device.

In particular, the matching engine 440 of the mobile rendering unit 230 matches the list of filter criteria that incorporates the settings to one of a plurality of supported chains of filter criteria. The matching follows the hierarchical order presented by the list of filter criteria. When matching, some or all of the filter criteria may be matched between the list of filter criteria and the selected chain of filter criteria. When filter criteria are not matched, then a fallback mechanism 445 is employed within the matching engine to locate the last matched filter criterion. The property value associated with the last matched filter criterion defines the resource that provides content configured to the contextual environment, where the contextual environment is defined by the settings.

Figure 5:
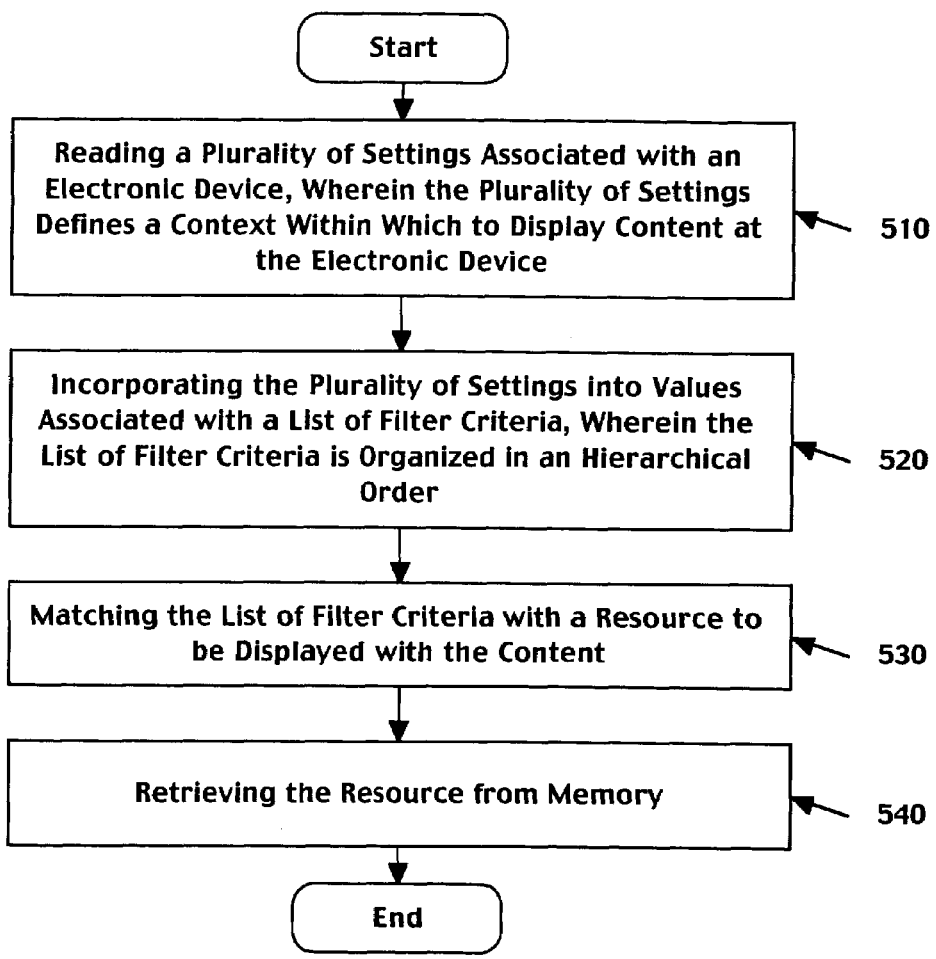
FIG. 5 is a flow chart illustrating steps in a computerized method for the creation and display of content by matching a list of filter criteria that is organized in a hierarchical order to a supported chain of filter criteria supported by the portal server, in accordance with one embodiment of the present invention.

Referring now to FIG. 5, a flow chart 500 is disclosed illustrating steps in a computer implemented method for displaying content that is configurable to a variety of contextual environments, in accordance with one embodiment of the present invention. More specifically, the present embodiment is able to select display configuration properties presented in an extensible multi-dimensional manner.

The present embodiment begins by reading a plurality of settings associated with an electronic device, at 510. The electronic device is requesting the content. In addition, as previously described, the plurality of settings defines a contextual environment within which to display the content at the electronic device.

At 520, the present embodiment continues by incorporating the plurality of settings into values associated with a list of filter criteria. The list of filter criteria is organized in a hierarchical order and gives precedence between filter criteria. The hierarchical order is represented in a nesting configuration, in one embodiment. As such, a first filter criterion nested above a second filter criterion has priority over the second filter criterion.

Figure 7:
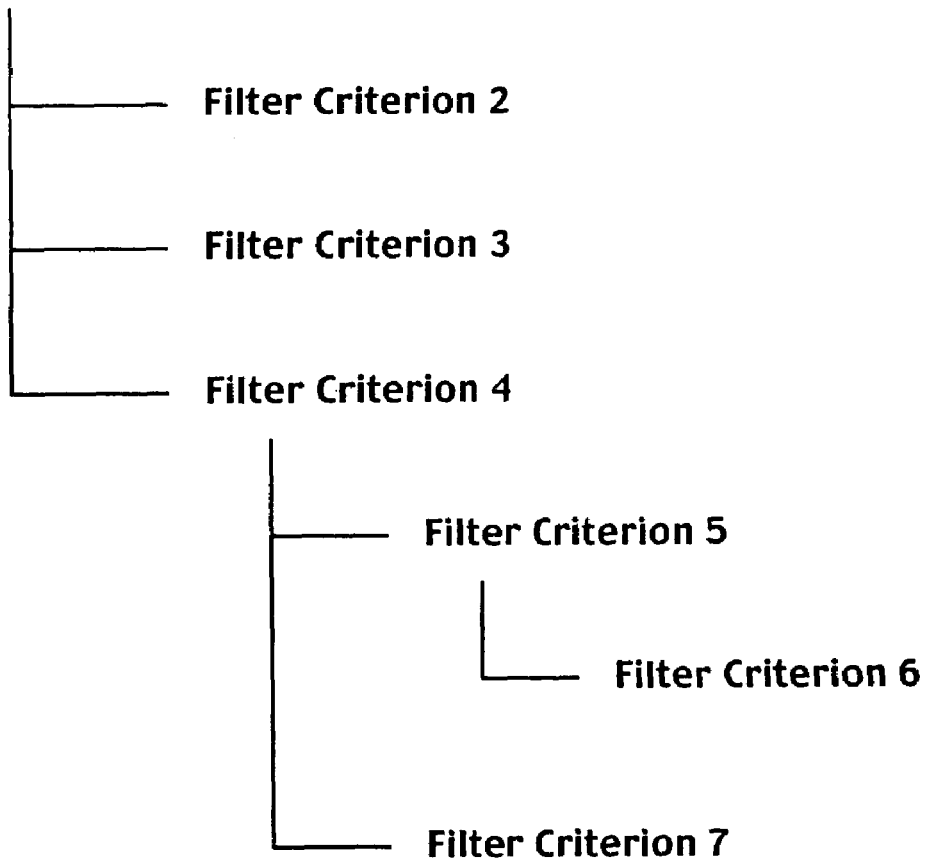
FIG. 7 is an exemplary list of filter criteria that illustrates the hierarchical order of filter criteria, the nesting configuration of filter criteria, and its multi-dimensional and extensible capabilities, in accordance with one embodiment of the present invention.

For example, FIG. 7 illustrates an exemplary list of filter criteria 700 that discloses the hierarchical order, in accordance with one embodiment of the present invention. In the list of filter criteria 700, the hierarchical order is determined starting from the top and proceeding down. For example, filter criterion 1 has priority over filter criteria 2, 3 and 4 in the hierarchical order. Also, filter criterion 2 has priority over filter criteria 3 and 4, and so on. As a result, filter criterion encountered first and above other filter criterion have priority.

In addition, FIG. 7 also illustrates the nesting configuration when determining the hierarchical order. In the nesting configuration, parent filter criterion have priority in the hierarchical order over nested filter criterion that are children of the parent filter criterion. For example, parent filter criterion 1 has priority in the hierarchical order over nested and children filter criteria 2, 3, and 4. In addition, filter criterion 4 is a parent to and has priority in the hierarchical order over filter criteria 5 and 7. Also, filter criterion 5 is a parent to and has priority in the hierarchical order over filter criterion 6.

Moreover, FIG. 7 illustrates the multi-dimensional feature of the list of filter criteria 700. By adding additional filter criterion to the list of filter criteria 700, the contextual environment described by the list of filter criteria 700 has added dimensions. Thus, a contextual environment can have one or more dimensions. In addition, the added dimensions are extensibly added to the list of filter criteria. Thus, the list of filter criteria describing a contextual environment is extensible and multi-dimensional.

Returning back to the flow chart in FIG. 5, at 530, the embodiment of flow chart 500 continues by matching the list of filter criteria with a resource to be displayed with the content. More specifically, the list of filter criteria, that has incorporated the settings associated with the wireless electronic device that is requesting content, is matched with a supported chain of filter criteria, as will be more fully described in relation to FIG. 6. The supported chain of filter criteria provides resources that are configured to a variety of contextual environments.

At 540, the embodiment describing flow chart 500 continues by retrieving the selected resource from memory. As such, the selected resource provides content that is configured to the contextual environment of the wireless device that is specified by the settings. As described previously, a plurality of resources is stored in a data store for easy retrieval. Each of the plurality of resources is configured to a particular contextual environment, as determined by how many matches are achieved between the list of filter criteria and the supported chain of filter criteria.

In another embodiment, the resource is sent to the wireless electronic device for display. Since the resource selected takes into account the contextual environment within which the wireless electronic device is operating, the content comprising the resource is presented in a manner that is configurable to the contextual environment. That is, the content is configured to provide the best communication of the content, as per design.

Figure 6:
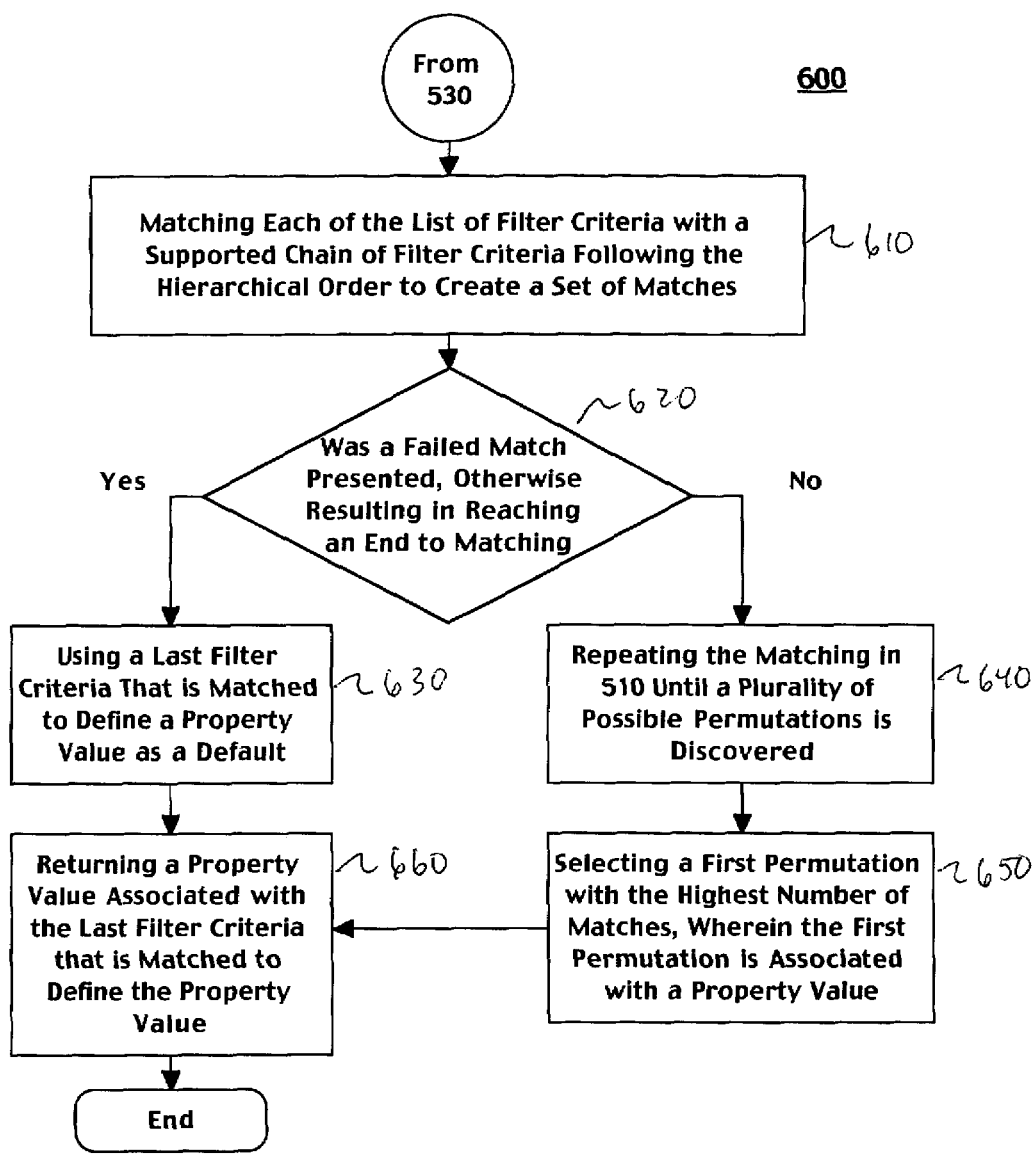
FIG. 6 is a flow chart illustrating steps in a computerized method for matching a list of filter criteria to a supported chain of filter criteria supported by a portal server, in accordance with one embodiment of the present invention.

Turning now to FIG. 6, a flow chart 600 is disclosed illustrating steps in a computer implemented method for matching a list of filter criteria to a supported chain of filter criteria, in accordance with one embodiment of the present invention. The flow chart 600 is a further description of block 530 of flow chart 500.

At 610, the present embodiment begins by matching each of a list of filter criteria to a supported chain of filter criteria. As described previously, the list of filter criteria has incorporated settings that are associated with the electronic device requesting content. Each of these settings is incorporated as values or objects to corresponding filter criterion. The list of filter criteria follows the hierarchical order used for configuring the content to the contextual environment as defined by the settings. In addition, the matching proceeds along the hierarchical order as presented in the list of filter criteria.

In general, at 610, filter criteria and their corresponding object is matched in the order presented in the list of filter criteria until no match is presented. More specifically, each filter criteria is matched to a type/value pair in the supported chain of filter criteria, in the hierarchical order presented. In the type/value pair, the type corresponds to filter criteria, and the value corresponds to the object of the filter criteria.

At 620, the present embodiment continues by determining what type of failed match was presented. If a failed match was presented, then the present embodiment continues to 630. On the other hand, if a failed match was not presented, this indicates that the matching between the list of filter criteria and the supported chain of filter criteria has completed all matches, and the present embodiment continues to 640.

At 630, a failed match is presented when the type and value attributes in the supported chain of filter criteria no longer match with the list of filter criteria. As such, the present embodiment falls back to a last filter criterion that is matched to define a property value.

At 660, more specifically, when the "type" and "value" attributes no longer match, the present embodiment returns the property value found in the last matched filter criteria. The property value defines the resource or content. In this way the property value or resource is determined that is configured for the contextual environment, as defined by the settings that are incorporated into the list of filter criteria.

An exception to 660 occurs when the filter criterion that fails is not required, or optional, in one embodiment of the present invention. That is, the required flag is turned off, in one embodiment, in which case, the embodiment of flow chart 600 proceeds to the next filter criterion for matching. As such, in the list of filter criteria, the optional filter criterion need not be matched to a filter criterion in the supported chain of filter criteria. On the other hand, if a filter criterion is required, then necessarily there must be a match between the filter criterion and a corresponding filter criterion in the supported chain of filter criteria.

For example, if a filter criterion in the list of filter criteria is required, then it must match for the overall typed lookup to succeed. On the other hand, if a filter criterion is not required, then it can fail to match without causing the overall lookup to reach a failed match. In this way, a chain of non-required filter criteria can be used to implement a progressively less-specific filter criteria lookup. For instance, given the filter criteria (locale=en, locale=US, date=Mar. 3, 2003), a successful match is made with a property value with the qualifier (local=en, date=Mar. 3, 2003), when the locale=US is optional, even though there is not a complete match.

Turning now to 640, the present embodiment proceeds differently when multiple matches are found. In this case, a failed match was not presented. In other words, the list of filter criteria and the supported chain of filter criteria matched all of the required filter criteria and their objects. In this case, another supported chain of filter criteria may exist by design. As such, the present embodiment repeats the matching in 510 until a plurality of possible matching permutations is discovered. That is, one matching permutation exists for the first supported chain of filter criteria, and a second matching permutation exists for the second supported chain of filter criteria.

As a result, in 660, when there are no permutations left, and multiple matches are found, the matching permutation with the highest number of matches is selected. In the selected matching permutation, a property value is determined by finding the last matched filter criteria in the associated supported chain of filter criteria and returning the property value that is associated with the last matched filter criteria, as is in the case when reaching a last filter criterion that is matched from 630.

While embodiments of the present invention have been described as selecting resources for display, other embodiments of the present invention are well suited to the selection of resources to define information that is used for configuring the content for display. The information is not necessarily displayed, but is used for calculating values that is displayed as the content, in one embodiment. In other embodiments, the selected resource provides information that is used for configuring content, such as, for example, defining the number of lines of output to send to an electronic device that is displaying the content. The method of FIG. 8 discusses in more detail, the selection of resources used for formatting content.

Figure 8:
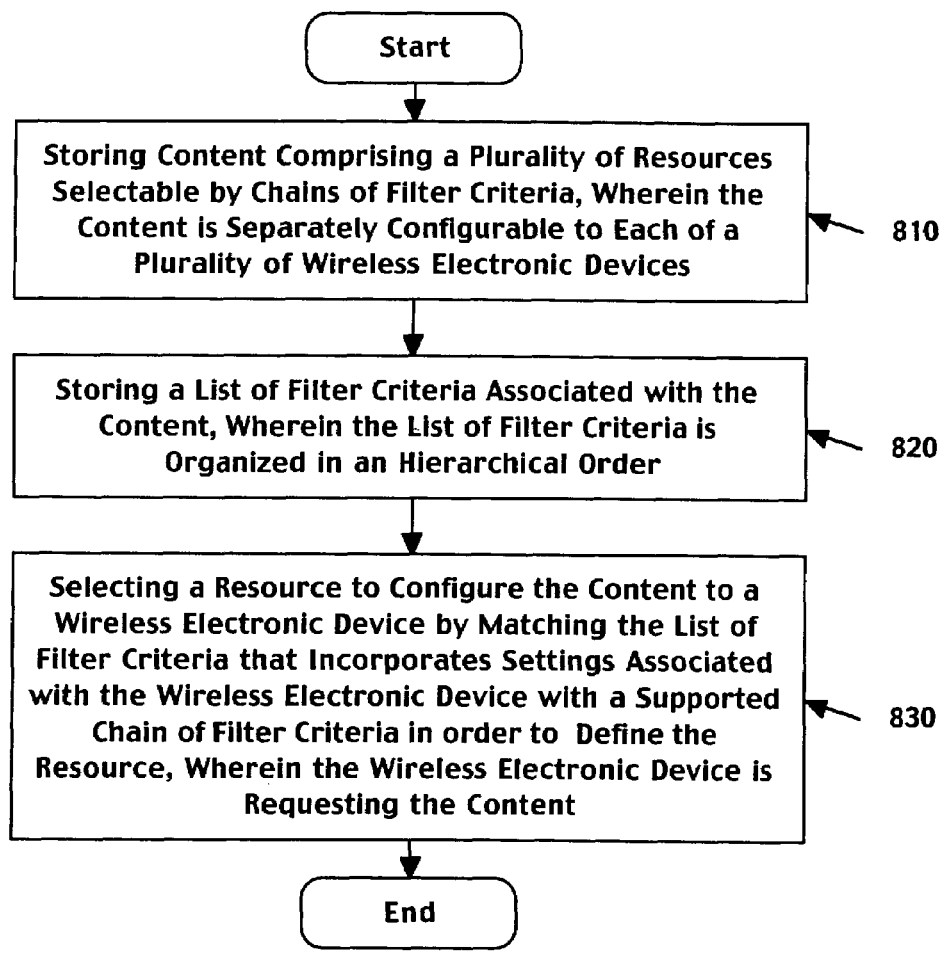
FIG. 8 is a flow chart illustrating steps in a computer implemented method for storing and retrieving extensible and multi-dimensional display property configurations, in accordance with one embodiment of the present invention.

Referring now to FIG. 8, a flow chart 800 is disclosed for storing and retrieving extensible and multi-dimensional display property configurations, in accordance with one embodiment of the present invention. Specifically, the method of flow chart 800 discloses a method for formatting content for an electronic device through a portal server. In that way, the content is configurable to a variety of contextual environments.

In one embodiment, the method of flow chart 800 is applicable to electronic devices that are wireless electronic devices. That is, content is configured and transferred to the wireless electronic device by the portal server, in one embodiment.

The present embodiment begins by storing content comprising a plurality of resources in memory that is accessible by the portal server, at 810. The plurality of resources is selectable by supported chains of filter criteria, wherein the content is separately configurable with each of a plurality of wireless electronic devices that define varying contextual environments.

At 820, the present embodiment continues by storing a list of filter criteria associated with the content. The list of filter criteria is organized in a hierarchical order. In one embodiment, the hierarchical order is determined by developer design.

At 830, the present embodiment continues by selecting a resource to configure the content to a wireless electronic device that is requesting the content. This is accomplished by matching the list of filter criteria with a chain of filter criteria that defines a resource. The resource is used to configure the content that is displayed at the electronic device.

Moreover, the list of filter criteria is adjusted for settings associated with the wireless electronic device to define a contextual environment within which the wireless electronic device is displaying the content. In particular, the settings are incorporated as values in the list of filter criteria.

In addition, a set of matches, or matched set of filter criteria is created by matching the list of filter criteria to a supported chain of filter criteria. The matched set of filter criteria is associated with a property value defining the resource.

In one embodiment, the resource comprises the content. In this case, the resource is transferred to the wireless electronic device for display.

In another embodiment, the resource defines information that is used in support of configuring content to be displayed at the electronic device. For example, the information can be used to dictate the number of lines of output that is sent to the electronic device. This is useful, especially if the electronic device has limited buffer space, as in a mobile wireless electronic device. In this case, the information may not be sent to the electronic device, but is used to configure the content that is ultimately displayed at the electronic device.

In another embodiment, the resource is used to define information that is used to compute or calculate a value. The value is then transferred to the electronic device for display as said content.

Table 1 is an exemplary pseudo code for implementing a filter criteria and publicly representing it in an abstract class, in accordance with one embodiment of the present invention, as follows.

TABLE 1

```
public class DateLaterThanFilter extends PropertiesFilter {
    private static final DateFormat dateFormat =
DateFormat.getDateInstance(DateFormat.SHORT);
    private static Date date = null;
    public DateLaterThanPropertiesFilter( ) {
        super( );
    }
    protected void init(String value, boolean exact) throws
PropertiesFilterException {
        super.init(value, exact);
        try {
            date = dateFormat.parse(value);
        } catch (ParseException pe) {
            throw new
PropertiesFilterException("DateLaterThanPropertiesFilter: ",
pe);
        }
    }
    public String getCondition( ) {
        return "dateLaterThan";
    }
    public boolean match(ProviderContext pc, String
condition, String value) throws PropertiesFilterException {
        Date cdate = null;
        try {
            cdate = dateFormat.parse(value);
        } catch (ParseException pe) {
            throw new
PropertiesFilterException("DateLaterThanPropertiesFilter.match( ): ", pe);
        }
        return condition.equals("dateLaterThan") &&
cdate.after(date);
    }
}
```

Table 2 is an exemplary pseudo code for storing display property configurations, or filter criteria, and their corresponding values or objects through a tag, called <ConditionalProperties> in a supported chain of filter criteria, in accordance with one embodiment of the present invention, as follows.

TABLE 2

```
<Properties>
    <String name="a"    value="b">
    <ConditionalProperties condition="client" value="nokia">
        <ConditionalProperties condition="locale"
value="de">
            <String name="a" value="nokia german b">
        </ConditionalProperties>
        <ConditionalProperties condition="locale"
value="en">
            <String name="a" value="nokia english b">
        </ConditionalProperties>
    </ConditionalProperties >
    <ConditionalProperties condition="client"
value="ericsson">
        <ConditionalProperties condition="locale"
value="en">
            <String name="a" value="ericsson english b">
        </ConditionalProperties>
    </ConditionalProperties >
</Properties>
```

Table 3 is an exemplary pseudo code for accessing the desired property value when matching a list of filter criteria to a supported chain of filter criteria, when determining the order of lookup precedence, as determined by the hierarchical order of the list of filter criteria, in accordance with one embodiment of the present invention. In Table 3, the "List pflist" discloses the list of filter criteria that has incorporated settings for defining the contextual environment of a wireless electronic device requesting content. The supported chain of filter criteria is provided above the "List pflist." In Table 3, the "locale" filter criterion is given priority over the "client" filter criterion, and results in a returned property value of "nokia german b."

TABLE 3

```
<Properties>
    <String name="a" value="b">
    <ConditionalProperties condition="locale" value="de">
        <ConditionalProperties condition="client"
value="nokia">
            <String name="a" value="german nokia b">
        </ConditionalProperties>
    </ConditionalProperties>
    <ConditionalProperties condition="client" value="nokia">
        <ConditionalProperties condition="locale"
            value="de">
            <String name="a" value="nokia german b">
        </ConditionalProperties>
    </ConditionalProperties>
</Properties>
    List pflist = new List( )    ;
    pflist.add(getProviderContext( ).getClientPropertiesFilter("nokia", true));
    pflist.add(getProviderContext( ).getLocalePropertiesFilter("de", true));
    getStringProperty(getName( ), "a", pflist);
```

Table 4 is an exemplary pseudo code for illustrating how the fallback mechanism of block 630 in flow chart 600 is implemented, in accordance with one embodiment of the present invention. In Table 4, the locale filter criterion takes priority over the client filter criterion. In addition, a first supported chain of filter criteria begins with the "locale" conditional properties, or filter criteria. A second supported chain of filter criteria begins with the "client" conditional properties, filter criteria. The first supported chain of filter criteria is matched with the list of filter criteria in the "List pflist." Since the "client" filter criteria is not matched, the fallback mechanism returns to the last matched filter criteria and returns a property value of "german b."

TABLE 4

```
<Properties>
    <String name="a" value="b">
    <ConditionalProperties condition="locale"
value="de">
        <String name="a" value="german    b"/>
        <ConditionalProperties condition="client"
value="ericsson">
            <String name="a" value="german ericsson b">
        </ConditionalProperties>
    </ConditionalProperties>
        <ConditionalProperties condition="client"
value="nokia">
            <String name="a"    value="nokia b">
        </ConditionalProperties>
</Properties>
    List pflist = new List( );
    pflist.add(getProviderContext( ).getLocalePropertiesFilter(
    "de", true));
    pflist.add(getProviderContext( ).getClientPropertiesFilter(
    "nokia", true));
    getStringProperty(getName( ), "a", pflist);
```

Table 5 is an exemplary pseudo code illustrating the fallback mechanism when no match is presented, in accordance with one embodiment of the present invention. In Table 5, the "locale" filter criterion a takes priority over the "client" filter criterion in the list of filter criteria; however, the supported chain of filter criteria has a reverse priority. As such, the returned property value is "b."

TABLE 5

```
Example 3:
<Properties>
    <String name="a" value="b">
    <ConditionalProperties condition="client" value="nokia">
        <ConditionalProperties condition="locale"
value="de">
            <String   name="a" value="nokia german b">
        </ConditionalProperties>
    </ConditionalProperties>
</Properties>
    List pflist = new List( );
    pflist.add(getProviderContext( ).getLocalePropertiesFilter(
    "de", true));
    pflist.add(getProviderContext( ).getClientPropertiesFilter(
    "nokia", true));
    getStringProperty(getName( ), "a", pflist);
```

Table 6 illustrates when the <string name> is incorrectly referring to a different resource, in accordance with one embodiment of the present invention. In Table 6, the "locale" filter criterion has priority over the "client" filter criterion in the list of filter criteria (pflist). The supported chain of filter criteria matches the list of filter criteria, however, the resource name "c" is different from its parent resource name "a." As a result, the property value returned is "german b."

TABLE 6

```
<Properties>
    <String name="a" value="b">
    <ConditionalProperties condition="locale"    value="de">
        <String name="a" value="german b"/>
        <ConditionalProperties condition="client"
        value="ericsson">
            <String name="c" value="german ericsson b">
```

TABLE 6-continued

```
        </ConditionalProperties>
      </ConditionalProperties>
</Properties>
    List pflist = new List( );
    pflist.add(getProviderContext( ).getLocalePropertiesFilter(
        "de", true));
    pflist.add(getProviderContext( ).getClientPropertiesFilter(
        "ericsson", true));
    getStringProperty(getName( ), "a", pflist);
```

Table 7 is an exemplary pseudo code illustrating how a required flag is used to ensure that a filter criterion is matched, in accordance with one embodiment of the present invention. In Table 7, the local filter criterion has priority over the "datelaterthan" filter criterion, which is optional. In addition, the "datelaterthan" filter criterion has priority over the "client" filter criterion. Although the "datelaterthan" filter criterion fails, since it is optional, there is no overall failure in the matching, and the returned property value is "en Mar. 3, 2003 nokia."

TABLE 7

```
<Properties>
    <String name="a" value="b">
        <ConditionalProperties condition="locale"     value="en">
            <String name="a" value="b"/>
        <ConditionalProperties condition="dateLaterThan"
value="03/03/2003">
            <ConditionalProperties condition="client"
value="nokia">
                <String name="a" value="en 03/03/2003
nokia">
            </ConditionalProperties>
        </ConditionalProperties>
        <ConditionalProperties condition="client"
value="nokia">
            <String name="a" value="en nokia">
        </ConditionalProperties>
    </ConditionalProperties>
</Properties>
    List pflist = new List( );
    pflist.add(getProviderContext( ).getLocalePropertiesFilter(
"en", true));
    String filter =
"com.acme.filters.DateLaterThanPropertiesFilter" ;
    pflist.add(getProviderContext( ).getPropertiesFilter(
filter, "02/02/2003", false));
    pflist.add(getProviderContext( ).getClientPropertiesFilter(
"nokia", true));
    getStringProperty(getName( ), "a",    pflist);
```

While the methods of embodiments illustrated in flow charts 500, 600, and 800 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for the storage and retrieval of extensible and multidimensional property configurations that are used to deliver content to a variety of contextual environments have been described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed is:

1. A method for providing content to an electronic device, comprising:

receiving, from said electronic device, a request for content;

obtaining a plurality of settings associated with said electronic device, wherein said plurality of settings defines a device contextual environment for displaying the content on said electronic device;

incorporating said plurality of settings into a list of filter criteria to obtain a populated list of filter criteria, wherein said populated list of filter criteria is organized in a hierarchical order;

matching said populated list of filter criteria with one of a plurality of support chains of filter criteria, wherein each of said plurality of support chains is associated with one of a plurality of resources, wherein each of said plurality of support chains is organized in said hierarchical order, wherein matching said populated list of filter criteria with one of said plurality of support chains of filter criteria comprises: matching filter criteria in said populated list of filter criteria with said plurality of supported chains using said hierarchical order to obtain a set of matches, wherein the set of matches do not include any exact matches;

selecting said one of said plurality of support chains of filter criteria from said set of matches, wherein selecting said one of said plurality of support chains of filter criteria from said set of matches comprises: determining said one of said plurality of support chains of filter criteria that matches the highest number of filter criteria in said populated list of filter criteria;

determining said one of said plurality of resources associated with said one of said plurality of support chains;

retrieving said one of said plurality of resources from memory, wherein each of said plurality of resources comprises the content formatted tot one of said plurality of contextual environments, wherein said device contextual environment is similar to said one of said plurality of contextual environments corresponding to said one of said plurality of resources; and providing, said one of said plurality of resources to said electronic device.

2. The method of claim 1, wherein at least one filter criteria in said populated list of filter criteria is optional.

3. The method of claim 1, wherein at least one filter criteria in said populated list of filter criteria is required.

4. The method of claim 1, wherein matching said populated list of filter criteria with one of said plurality of support chains of filter criteria comprises:

matching filter criteria in said populated list of filter criteria with said plurality of supported chains using said hierarchical order to obtain a set of matches; and selecting said one of said plurality of support chains of filter criteria from said set of matches.

5. A portal server comprising:

a data store configured to store a plurality of resources associated with content provided by a channel, wherein each of said plurality of resources comprises said content formatted for one of a plurality of contextual environments;

a memory, coupled to said data store, configured to store a plurality of settings associated with an electronic device, wherein said plurality of settings defines a device contextual environment for displaying said content on said electronic device;

a list creator configured to incorporate said plurality of settings into a list of filter criteria to obtain a populated list of filter criteria, wherein said populated list of filter criteria is organized in a hierarchical order;

a matching engine, coupled to said memory, configured to match said populated list of filter criteria with one of a plurality of support chains of filter criteria, wherein each of said plurality of support chains is associated with one of a plurality of resources, wherein each of said plurality of support chains is organized in said hierarchical order, and wherein the matching engine is further configured to determine said one of said plurality of resources associated with said one of said plurality of support chains;

wherein matching said populated list of filter criteria with one of said plurality of support chains of filter criteria comprises: matching filter criteria in said populated list of filter criteria with said plurality of supported chains using said hierarchical order to obtain a set of matches, wherein the set of matches do not include any exact matches;

selecting said one of said plurality of support chains of filter criteria from said set of matches, wherein selecting said one of said plurality of support chains of filter criteria from said set of matches comprises: determining said one of said plurality of support chains of filter criteria that matches the highest number of filter criteria in said populated list of filter criteria;

wherein said portal server is configured to receive from the electronic device a request for content, wherein said portal server is further configured to obtain said plurality of settings associated with said electronic device, wherein said portal server is further configured to retrieve said one of said plurality of resources from memory, wherein said device contextual environment is similar to said one of said plurality of contextual environments corresponding to said one of said plurality of resources, and wherein said portal server is further configured to provide said one of plurality of resources to said electronic device.

6. The portal server of claim 5, wherein said matching engine is further configured to match filter criteria in said populated list of filter criteria with said plurality of supported chains using said hierarchical order to obtain a set of matches, and select said one of said plurality of support chains of filter criteria from said set of matches.

7. The portal server of claim 5, wherein said electronic device is coupled to said portal server through a communication network.

8. The portal server of claim 7, wherein said electronic device comprises a wireless portable electronic device.

9. A computer system comprising:
a processor; and
a computer readable memory coupled to said processor and containing program instructions that, when executed, implement a method of providing content providing content to an electronic device, comprising:

receiving, from said electronic device, a request for content;

obtaining a plurality of settings associated with said electronic device, wherein said plurality of settings defines a device contextual environment for displaying the content on said electronic device;

incorporating said plurality of settings into a list of filter criteria to obtain a populated list of filter criteria, wherein said populated list of filter criteria is organized in a hierarchical order;

matching said populated list of filter criteria with all one of a plurality of support chains of filter criteria, wherein each of said plurality of support chains is associated with one of a plurality of resources, wherein each of said plurality of support chains is organized in said hierarchical order, wherein matching said populated list of filter criteria with one of said plurality of support chains of filter criteria comprises: matching filter criteria in said populated list of filter criteria with said plurality of supported chains using said hierarchical order to obtain a set of matches, wherein the set of matches do not include any exact matches;

selecting said one of said plurality of support chains of filter criteria from said set of matches, wherein selecting said one of said plurality of support chains of filter criteria from said set of matches comprises: determining said one of said plurality of support chains of filter criteria that matches the highest number of filter criteria in said populated list of filter criteria;

determining said one of said plurality of resources associated with said one of said plurality of support chains;

retrieving said one of said plurality of resources from memory, wherein each of said plurality of resources comprises the content formatted tot one of said plurality of contextual environments, wherein said device contextual environment is similar to said one of said plurality of contextual environments corresponding to said one of said plurality of resources; and providing, said one of said plurality of resources to said electronic device.

10. The computer system of claim 9, wherein at least one filter criteria in said populated list of filter criteria is optional.

11. The computer system of claim 9, wherein at least one filter criteria in said populated list of filter criteria is required.

12. The computer system of claim 9, wherein matching said populated list of filter criteria with one of said plurality of support chains of filter criteria further comprises:

matching filter criteria in said populated list of filter criteria with said plurality of supported chains using said hierarchical order to obtain a set of matches; and selecting said one of said plurality of support chains of filter criteria from said set of matches.

* * * * *

UNITED STATES PATENT AND TRADEMARK OFFICE
CERTIFICATE OF CORRECTION

| | | |
|---|---|---|
| PATENT NO. | : 7,506,070 B2 | Page 1 of 1 |
| APPLICATION NO. | : 10/621486 | |
| DATED | : March 17, 2009 | |
| INVENTOR(S) | : Luu D. Tran et al. | |

It is certified that error appears in the above-identified patent and that said Letters Patent is hereby corrected as shown below:

On the Title Page:

On the Title Page, Item (73) Assignee, "Sun Microsytems, Inc." should be

--Sun Microsystems, Inc.--.

In the Claims:

In Claim 1, column 18, line 45, the word "tot" should be --for--.

In Claim 9, column 20, line 17, the word "all" should be deleted.

In Claim 9, column 20, line 40, the word "tot" should be --for--.

Signed and Sealed this

Twenty-sixth Day of May, 2009

JOHN DOLL
*Acting Director of the United States Patent and Trademark Office*